Patented May 19, 1942

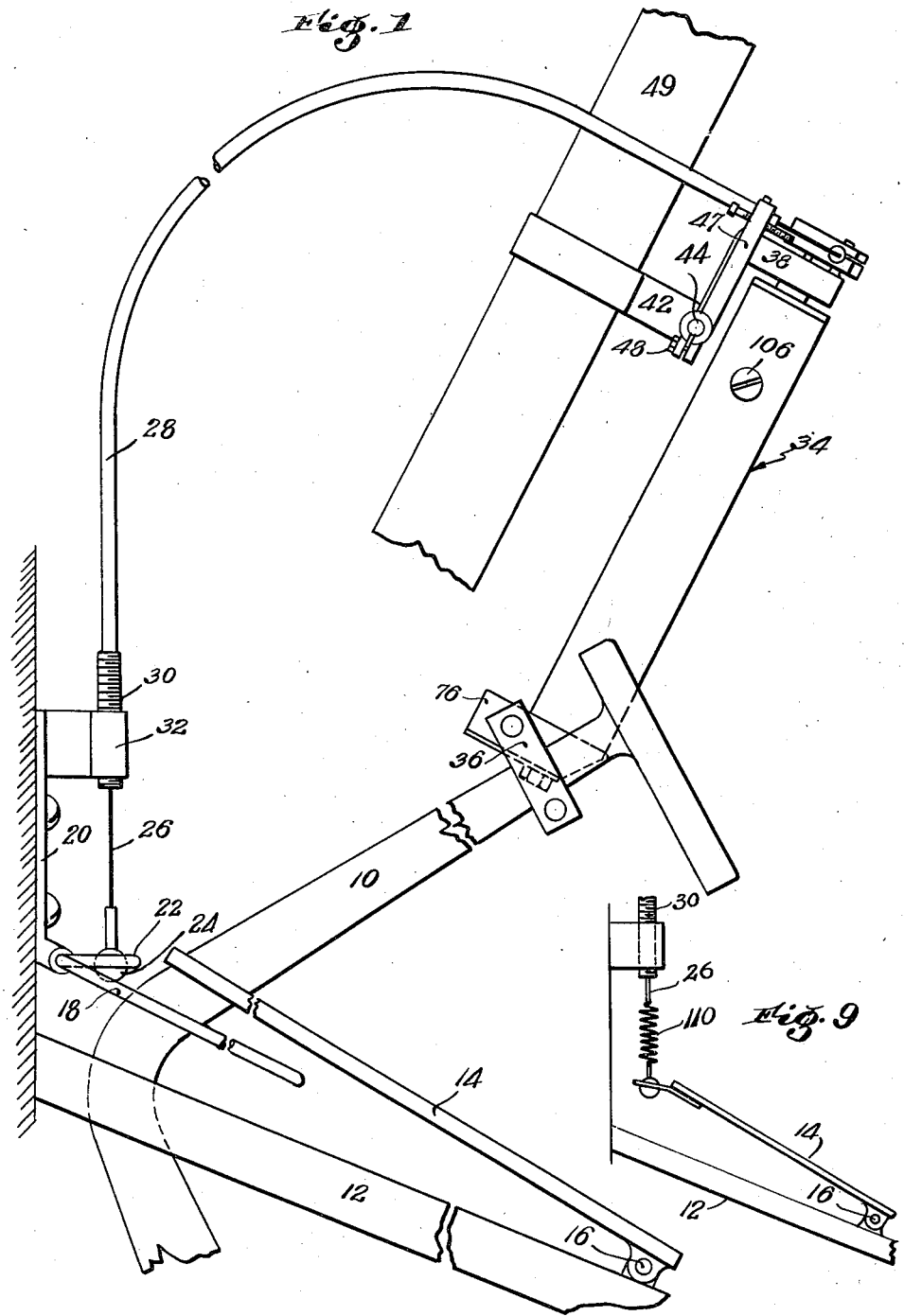

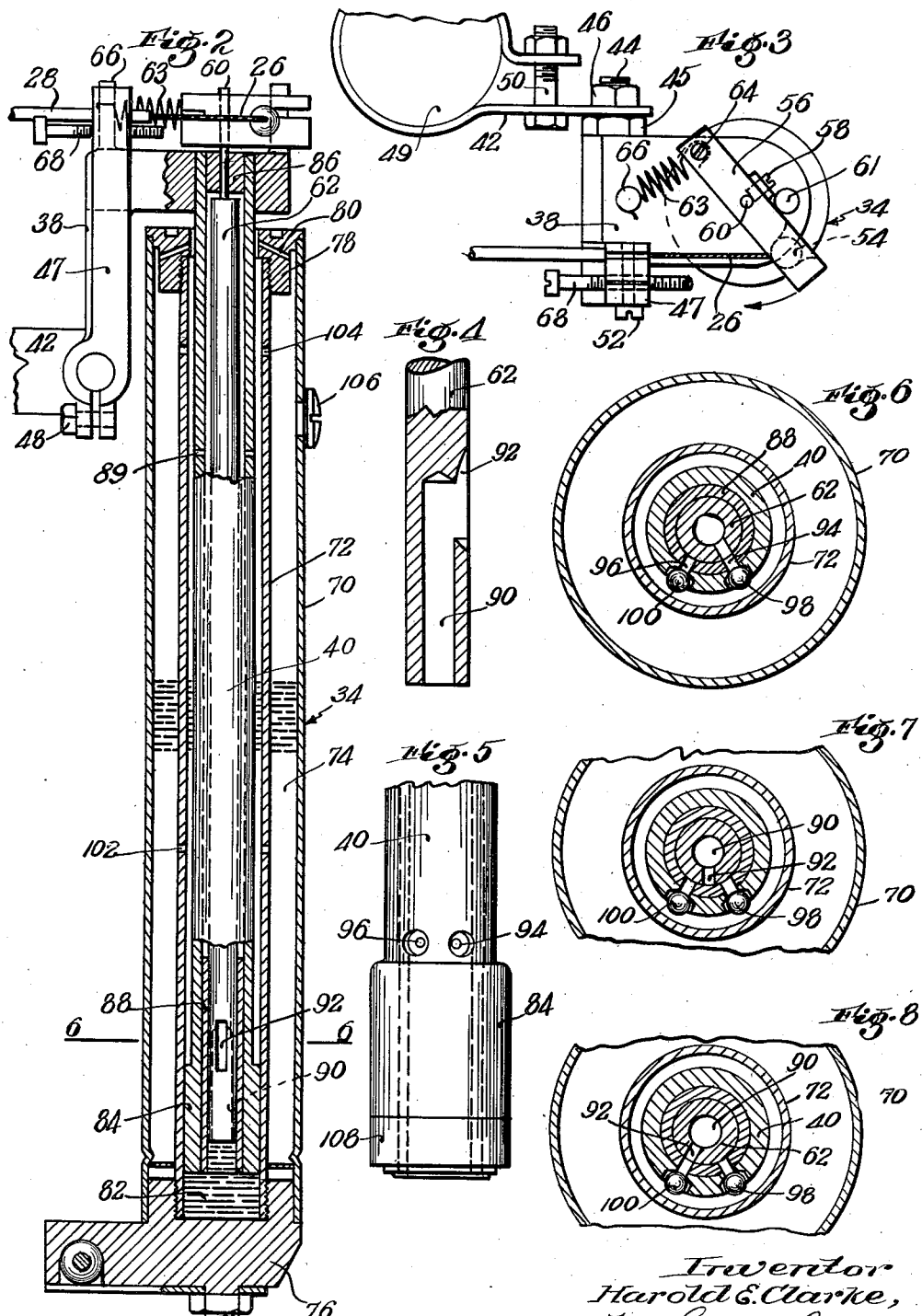

2,283,423

UNITED STATES PATENT OFFICE 2,283,423

CLUTCH CONTROL DEVICE

Harold E. Clarke, West Somerville, Mass.

Application August 23, 1940, Serial No. 353,856

10 Claims. (Cl. 192—.01)

This invention relates to improvements in a clutch control device, and more particularly to means for automatically controlling the engagement of the motor vehicle clutch thus eliminating the necessity for manual control for clutch engagement by foot pressure applied to the clutch pedal as it is allowed to return.

The present application discloses improvements over the clutch control devices disclosed in my earlier applications Serial No. 202,266, filed April 15, 1938, Patent No. 2,230,132, issued January 28, 1941, and Serial No. 230,047, filed September 15, 1938, Patent No. 2,215,496, issued Sept. 24, 1940. In each of the above applications I have disclosed a liquid dash pot device comprising the combination of a cylinder and plunger and valve means controlling the flow of liquid from the dash pot chamber, the valve means being regulated in the first application responsive to vacuum derived from the manifold, and in the second application the valve means being regulated by the combined effect of the relative position of the plunger with respect to the cylinder determined by movement of the clutch and the movement of the accelerator which has a compensating action.

It is an object of the present invention to provide an automatic clutch control device including a dash pot having valve means controlling the escape of fluid from the dash pot chamber in which the valve, as the clutch approaches engagement, is movable between spaced ports which allow escape of fluid and a more rapid movement of the clutch as the valve is moved in either direction from its retarding position intermediate the ports, and to control the movement of the valve by the combined action of the relative movement of the plunger with respect to the cylinder responsive to clutch movement, and the compensating movement of the accelerator pedal.

More specifically, it is an object of the present invention to provide a liquid dash pot device for automatically controlling the engagement of a clutch comprising a plunger movable with respect to the dash pot cylinder, the plunger having a rotatable valve rod therein having a single valve port and the plunger having a pair of spaced valve ports through which fluid may escape from the dash pot chamber as the valve rod is turned in either direction from a retarding position between said ports.

Further objects and advantages of my improvements will be more readily apparent from the following description of a preferred embodiment thereof as disclosed in the attached drawings in which:

Fig. 1 is a diagrammatical broken elevation showing the installation of my clutch control device;

Fig. 2 is a vertical section taken through the dash pot unit of the clutch control device;

Fig. 3 is a plan view of the upper end of the dash pot showing the mounting and controls therefor;

Fig. 4 is an enlarged view, partially shown in vertical section, of the lower end of the valve rod;

Fig. 5 is an enlarged elevation of the lower end of the dash pot plunger;

Fig. 6 is a horizontal section taken on the plane indicated 6—6 of Fig. 2 and showing the at rest position of the parts;

Fig. 7 is a view similar to Fig. 6 but showing the parts in position corresponding to full disengagement of the clutch;

Fig. 8 is a view similar to Figs. 6 and 7 showing the parts in retarding position for slow movement of the clutch as it approaches engagement; and Fig. 9 is a diagrammatic view showing a modification of the accelerator control of the flexible cable.

The operating parts may be installed generally similar to the disclosure in my prior application Serial No. 230,047, filed September 15, 1938, it being understood that other forms of mountings may be resorted to without departing from the spirit of my invention.

In Fig. 1, the clutch pedal 10 extends through the floorboard 12 on which is supported the usual accelerator pedal 14 pivoted at 16. Movement of the accelerator pedal will engage a lever 18 which is pivotally mounted on a bracket 20 mounted in some suitable fixed position beneath the dash of the vehicle. The lever 18 has an arm 22 which engages the ball member 24 secured to one end of a flexible cable 26. The cable 26 runs through a flexible conduit 28, one end of which has a screw threaded member 30 threaded into an extension 32 from the fixed bracket 20. This connection permits shortening or lengthening of the flexible conduit 28 between the two supported ends thereof. A dash pot cylinder 34 is fixed in some suitable manner, such as by the bracket 36, to the clutch pedal or other movable part of the clutch. An L-shaped bracket 38 is fixed to a dash pot plunger 40 slidably associated with the dash pot cylinder 34. The bracket 38 is pivotally connected to a clamp bracket 42 by means of the pivot bolt 44 secured by the nuts 45 and 46. An arm 47 is fixed to the outer end of the bolt 44 by a clamp bolt 48. The bracket 42 is fixed to the steering post 49 by means of a clamp bolt 50.

The flexible conduit 28 is clamped to the fixed arm 47 by a screw 52. The flexible cable 26 is connected to a ball 54 received in an opening at one end of a lever arm 56. The arm 56 is fixed by a set screw 58 to a reduced extension 60 from the valve rod 62. The arms 56, when at rest, may engage a stop 61 under the force of a tension spring 63 connected to a screw 64 at one end of the arm 56 and to a pin 66 fixed to the bracket 38. The movement of the arm 56 in a clockwise direction from the position shown in Fig. 3 is limited by an adjustable screw threaded stop member 68 which is mounted in the fixed arm 47.

The dash pot cylinder, which has been generally indicated 34, includes an outer cylinder 70 and an inner cylinder 72, concentrically mounted to provide a chamber 74 between the cylinders which constitutes an oil reservoir. The cylinders 70 and 72 are secured at their lower ends to a base plate 76 by which the dash pot cylinder is pivotally mounted on the clutch pedal. The upper ends of the cylinders 70 and 72 are secured by a closure 78, which is provided with vents 80 to lead any oil reaching the top of the inner cylinder 72 back into the reservoir 74. The dash pot chamber 82, at the bottom of the inner cylinder 72, is placed under compression by an enlarged piston head 84 of the piston rod or plunger 40. The head 84 closely fits the inner wall of the cylinder 72. The rotatable valve rod 62 is mounted in the hollow piston rod 40 and held against vertical displacement by the bushing 86 which is pressed into the upper end of the plunger 40. The valve rod is of somewhat smaller diameter than the interior of the plunger, but a bushing 88 is provided at the lower end of the piston rod to make a close fit between the valve rod and the plunger. A relief opening 89 may be provided in the plunger 40 at the upper end to allow the escape of oil which may leak past the bushing 88.

As shown in Fig. 4, the valve rod 62 has an opening 90 drilled into the lower end thereof. A slot 92 is cut into the side of the rod 62 into communication with the vertical opening 90. The slot 92 forms a valve port which cooperates as the valve rod is turned, with a first port 94 and a second port 96 drilled radially through the piston rod 40 and bushing 88. The ports 94 and 96 may be somewhat enlarged at their outer ends to receive balls 98 and 100 which, as will be explained hereafter, are used to prevent noise.

The cylinder 72 has relatively small by-pass ports 102 which function to allow fairly rapid movement of the piston rod with respect to the dash pot cylinder until the ports 102 are closed by the head 84 of the piston. Openings 104 may also be provided at the upper end of the cylinder to allow the oil above the piston head to return to the reservoir. A removable plug 106 is shown on the side of the outer cylinder 70 which, upon removal, permits filling of the oil reservoir. The plunger head 84 may have a rawhide sealing washer 108 to prevent leakage of oil past the plunger head.

It will be understood that in normal, at rest, position, that is, with the clutch fully engaged, the piston head will be near the bottom of the dash pot chamber as shown in Fig. 2, and the valve ports with the accelerator closed will be in the relative positions shown in Fig. 6. Depression of the clutch pedal 10, thereby disengaging the clutch, will tend to pull the dash pot cylinder down with respect to the piston rod. At the same time, due to the mounting of the parts, the dash pot cylinder 34, as shown in Fig. 1, will tend to swing about the pivot bolt 44, and in Fig. 1 this movement would be in a clock-wise direction. This swinging movement of the cylinder and piston rod tends to tension the cable 26. Initially, as the cable is moved the lever 18 will be moved in a counter clock-wise direction until it contacts the accelerator pedal 14. Further movement of the cable will tend to swing the valve arm 56, as shown in Fig. 3, in a clock-wise direction away from the stop 61 and towards the adjustable stop 68. The movement of the arm 56 will thereby rotate the valve rod 62 from the position shown in Fig. 6, past the position shown in Fig. 7 and to a position such as shown in Fig. 8. If the gear shift lever is then placed in position for low speed and the operator drops his foot from the clutch pedal, the pedal 10 will quickly return while the piston head 84 is traveling towards the by-pass ports 102. After the ports 102 have been closed, however, by the piston head, the oil will tend to become compressed in the dash pot cylinder and will be forced to escape through the vertical passage 90 in the valve rod 62. This escape, however, is temporarily prevented as during the first portion of the return movement of the clutch pedal the valve rod 62 has been rotated counter clock-wise from the position shown in Fig. 8 to a position such as shown in Fig. 7. There will be a very slight leakage of oil since the parts are closely, but not tightly, fitted, and this slow leakage and movement of the parts will occur as the clutch is about to engage. The parts are so adjusted that the clutch will not come in so rapidly as to cause stalling of the engine, and also so that the clutch will not come in so slowly that unnecessary wear, due to slipping of the clutch occurs.

The space between the relatively small ports 94 and 96 is only slightly larger than the slot or port 92 which is cut into the valve rod 62. When the port 92 is in the retarding position shown in Fig. 7 intermediate the ports 94 and 96, the movement of the clutch is so slow that it is almost stopped. The retarding of the clutch to bring it almost to a stop may be very accurately adjusted with respect to the engagement of the clutch by turning the screw threaded member 30 to lengthen or shorten the flexible conduit 28 between the supporting ends thereof. If, for example, the member 30 is turned to move upwards with respect to its bracket 32, the valve rod 62 would be turned a little farther as the clutch pedal is depressed to disengage the clutch which will cause retardation of the clutch a little later as the pedal returns, while if the member 30 is screwed downwards so as to shorten the conduit 28, the retardation will occur earlier. This adjustment may be made so that the vehicle will start in low speed without stalling of the engine even though the accelerator is not moved. The very slow movement of the clutch as it is about to engage will take place due to a very slight leakage of oil, but as the rod 62 comes into communication with the port 94 the oil is allowed to escape more rapidly bringing about full clutch engagement and full return of the clutch pedal to its normal position.

The action thus far has been explained without referring to the effect produced by movement of the accelerator pedal. Assuming again that the clutch has been disengaged by depression of the clutch pedal, the normal operation would be, after engaging the gears, to remove the foot from the clutch pedal and then to slowly depress the accelerator pedal as the clutch engages and the vehicle picks up speed. Depression of the accelerator pedal 14 will cause movement of the lever 18, the space between the pedal 14 and lever 18 being closed by the relative position of the clutch pedal. The action of the accelerator movement, as the throttle is opened, will be to pull the cable 26 through the flexible conduit 28 and to rotate the arm 56 and valve rod 62 in a clock-wise direction from the position shown in Fig. 3. Thus, although the clutch pedal may have returned so that the valve rod 62 is in the retarding position shown in Fig. 7, depression of the accelerator will tend to rotate the valve stem until the port 96 is opened as shown in Fig. 8. This will bring about a more rapid closing of the clutch which is desirable as the gear is shifted into higher speeds. If the accelerator is allowed to return to close the throttle before full engagement of the clutch has occurred, the valve rod 62 will be rotated counter clockwise tending to bring the valve port 92 into communication with the port 94, thus bringing about full engagement of the clutch and full return of the clutch pedal to its normal position.

In the installation of my clutch control mechanism, the relatively movable dash pot cylinder and plunger are mounted, respectively, on the clutch pedal and steering post as shown in Fig. 1, it being understood that other forms of mounting may be resorted to in which relative movement of the cylinder and plunger occurs responsive to movement of the clutch. The brackets 36 on the clutch pedal and 42 on the steering post are so positioned that the ports 102 will be closed by the plunger head 84 just prior to initial engagement of the clutch plates. The screw threaded member 30 is adjusted as previously described so that the full retarding effect of the dash pot means comes into operation just as the clutch is about to engage and provides a smooth pick-up without stalling of the engine. The stop 68 is adjusted to provide a limit for movement of the arm 56 responsive to depression of the accelerator pedal and it will be understood that this stop tends to prevent opening the throttle of the engine too wide in view of the relative position of the dash pot cylinder and piston, but that the operator may still press the accelerator pedal down due to springing of the arm 18. The stop 68 is carried by the fixed part 47 while the arm 56 is movable with the plunger 40 as the plunger swings about the pivot 44. Disengagement of the clutch, producing a swinging movement of the plunger 40 with respect to the pivot 44, results in movement of the arm 56 in a clockwise direction from the position shown in Fig. 3 after the pedal controlled arm 18 has come into contact with the accelerator pedal 14. In this position depression of the accelerator pedal causing opening movement of the throttle tends to further move the arm 56 in a clockwise direction. The arm 56 is free to move in this position since it is swung away from the stop 68. When the clutch pedal is allowed to return, the swinging movement of the plunger 40 will bring the arm 56 into contact with the stop 68 to positively move the arm 56 towards closed position just as the clutch is about to engage. It will be understood that this action may be controlled by adjustment of the stop 68. The movement of the arm 56 in counter-clockwise direction as the result of contact with the stop 68 is a positive movement independent of the position of the accelerator pedal or of the engine throttle. The effect is to substantially stop the movement of the clutch just as it is about to engage. The balls 98 and 100, shown in Figs. 6, 7 and 8, are not intended to serve the purpose of check valves but are used to prevent noise which may otherwise occur as the clutch pedal is thrown out and the piston 40 raised with respect to the cylinder 72. The provision of the balls 98 and 100 prevents the entrance of the oil through the relatively small openings 94 and 96 whereby the oil is not sucked into the dash pot chamber 82 until the piston head 84 has passed the openings 102 which allow the oil to flow from the reservoir. It will be understood that as the clutch engages further movement of the accelerator is permitted.

In Fig. 1 the accelerator pedal is not directly connected to the cable 26. A modified form of installation is shown in Fig. 9 in which the accelerator pedal 14 is connected to the cable 26 through a stiff spring 110. The spring serves the same purpose as the lost motion between the pedal 14 and lever 18 in Fig. 1. It will be further understood that some similar form of connection between the cable 26 and a movable part of the throttle actuating means may be resorted to if the clutch control device is installed under the hood.

I claim:

1. In a mechanism for automatically controlling the engagement of a motor vehicle clutch, dash pot means comprising a cylinder and a plunger member cooperating therewith relatively movable responsive to movement of the clutch whereby said dash pot means acts to retard the engagement of the clutch, means to variably regulate the rate of retardation by restricting the escape of fluid from the dash pot chamber comprising a valve member associated with said plunger member and movable relatively thereto, one of said members having a single escape passage and the other of said members having a pair of escape passages and control means for causing relative movement between said members to bring said single passage into communication with one of said pair of passages or to close said single passage when intermediate said pair of passages.

2. In a mechanism for controlling the engagement of a motor vehicle clutch, dash pot means including a cylinder and a plunger cooperating therewith, means for producing relative movement between said cylinder and plunger responsive to the movement of the clutch whereby said dash pot means acts to retard the engagement of the clutch, valve means variably controlling the retarding effect of the dash pot means comprising relatively movable valve members, one of which is provided with a pair of spaced valve ports and the other of which is provided with a single valve port, means for limiting the relative movement of said valve members whereby said single port at any time is in communication with one of said pair of ports or is in a closed position intermediate said pair of ports and means for controlling the relative movement between said valve members.

3. In a mechanism for controlling the engagement of a motor vehicle clutch, a dash pot cylinder having a compression chamber and a reservoir, a dash pot plunger relatively movable with respect to said cylinder, valve means restricting the escape of fluid from said compression chamber towards said reservoir, comprising a rotatable valve rod fitting within said plunger having a single valve port in the side wall thereof and a passage leading to said valve port from the compression chamber, said plunger having a pair of circumferentially spaced valve ports through which the fluid may escape towards the reservoir, means responsive to movement of the clutch for producing relative movement between said cylinder and plunger and simultaneously causing relative movement between said valve rod and said plunger whereby the valve port in said valve rod is moved in one direction into communication with one of said pair of ports in said plunger to permit rapid movement of the clutch just prior to engagement, and whereby said valve port in said valve rod is brought into communication with the other of said ports in said plunger to permit rapid movement of the clutch to complete the engagement, and whereby the movement of the clutch while it is engaging is retarded as said single valve port moves between said pair of ports.

4. In a mechanism for automatically controlling the engagement of a motor vehicle clutch, dash pot means including a liquid filled compression chamber and a reservoir, and a relatively movable cylinder and plunger movable responsive to movement of the clutch to retard the engagement of the clutch, a relatively rotatable valve rod received within said plunger and having a liquid escape passage leading from the compression chamber to a single valve port in the side wall of said valve rod, said plunger having a pair of escape ports through which the liquid may flow towards the reservoir, said single valve port being normally in communication with one of said pair of ports and means for moving said valve rod to bring said single valve port into communication with the other of said pair of ports responsive to disengagement of the clutch, said valve rod moving back past a retarding position as the single valve port passes between the pair of ports whereby clutch movement is retarded as it is about to engage.

5. In a mechanism for automatically controlling the engagement of a motor vehicle clutch, dash pot means including a liquid filled compression chamber and a reservoir, and a relatively movable cylinder and plunger movable responsive to movement of the clutch to retard the engagement of the clutch, a relatively rotatable valve rod received within said plunger and having a liquid escape passage leading from the compression chamber to a single valve port in the side wall of said valve rod, said plunger having a pair of escape ports through which the liquid may flow towards the reservoir, said single valve port being normally in communication with one of said pair of ports and means for moving said valve rod to bring said single valve port into communication with the other of said pair of ports responsive to disengagement of the clutch, said valve rod moving back past a retarding position as the single valve port passes between the pair of ports whereby clutch movement is retarded as it is about to engage and means responsive to movement of the throttle control of the vehicle tending to cause further movement of the valve rod in order to obtain a faster engagement of the clutch.

6. In a mechanism for automatically controlling the engagement of a motor vehicle clutch, dash pot means including a cylinder and a plunger member cooperating therewith relatively movable responsive to movement of the clutch, said cylinder and plunger enclosing a compression chamber effective to retard the engagement of the clutch, a relief passage leading from the compression chamber, valve means variably controlling said relief passage and the rate of retardation of the engagement of the clutch, means operatively connected to said valve means tending to open said relief passage and decrease the retarding action responsive to opening movement of the throttle and positively acting means effective to substantially close the passage and prevent escape of fluid from the compression chamber independent of the position of the throttle as the clutch approaches engagement to substantially stop the movement of the clutch before it is fully engaged.

7. In a mechanism for automatically controlling the engagement of a motor vehicle clutch, dash pot means including a cylinder and a plunger member cooperating therewith relatively movable responsive to movement of the clutch, said cylinder and plunger enclosing a compression chamber effective to retard the engagement of the clutch, a relief passage leading from the compression chamber, valve means variably controlling said relief passage and the rate of retardation of the engagement of the clutch, means operatively connected to said valve means tending to open said relief passage and decrease the retarding action responsive to opening movement of the throttle and positively acting means effective to move said valve means towards substantially closed position independent of the position of the throttle as the clutch approaches engagement.

8. In a mechanism for automatically controlling the engagement of a motor vehicle clutch, dash pot means including a cylinder and a plunger member cooperating therewith relatively movable responsive to movement of the clutch, said cylinder and plunger enclosing a compression chamber effective to retard the engagement of the clutch, a relief passage leading from the compression chamber, valve means variably controlling said relief passage and the rate of retardation of the engagement of the clutch, means operatively connected to said valve means tending to open said relief passage and decrease the retarding action responsive to opening movement of the throttle, positively acting means effective to move said valve means towards substantially closed position independent of the position of the throttle as the clutch approaches engagement, said valve means including a valve rod extending through said plunger and movable relatively thereto and an arm fixed to the outer end of said valve rod and said positively acting means comprising a fixed stop adapted to be engaged by said arm.

9. In a mechanism for automatically controlling the engagement of a motor vehicle clutch, dash pot means comprising relatively movable cylinder and plunger members enclosing a compression chamber effective to retard the engagement of the clutch, one of said members being pivotally mounted at a fixed point and the other of said members being pivotally connected to a part movable in response to movement of the clutch, a relief passage leading from the compression chamber, a valve rod extending through said plunger and movable relatively thereto, said plunger and valve rod having valve ports forming a variably controlled portion of the relief passage, an arm fixed to the outer end of said valve rod, spring means acting upon said arm tending to move said arm and valve rod in one direction, throttle controlled means connected to said arm tending to move said valve rod in the opposite direction responsive to opening of the throttle, and an adjustable stop member mounted in fixed position relative to the pivotally mounted plunger and valve rod, said arm being brought into engagement with said stop member to limit the movement of the valve rod independent of the throttle controlled means.

10. In a mechanism for automatically controlling the engagement of a motor vehicle clutch, dash pot means including a cylinder and a plunger member cooperating therewith, said cylinder and plunger being relatively movable responsive to movement of the clutch and enclosing a compression chamber effective to retard the engagement of the clutch, a single relief passage leading from the compression chamber, valve means variably controlling said relief passage, means effective to move said valve means to open said relief passage when the clutch is fully engaged or fully disengaged, said means being effective to move said valve means to substantially close said relief passage and prevent the escape of fluid from the compression chamber to retard the engagement of the clutch as the clutch approaches engagement.

HAROLD E. CLARKE.